United States Patent [19]

Best

[11] 4,417,316
[45] Nov. 22, 1983

[54] DIGITAL BINARY INCREMENT CIRCUIT APPARATUS

[75] Inventor: David W. Best, Marion, Iowa

[73] Assignee: Rockwell International Corporation, El Segundo, Calif.

[21] Appl. No.: 283,267

[22] Filed: Jul. 14, 1981

[51] Int. Cl.³ .............................................. G06F 7/50
[52] U.S. Cl. .................................................. 364/770
[58] Field of Search ........................ 364/770; 307/472; 377/126

[56] References Cited

U.S. PATENT DOCUMENTS

| | | | |
|---|---|---|---|
| 3,989,940 | 11/1976 | Kihara ................................... | 364/770 |
| 4,052,604 | 10/1977 | Maitland et al. ................ | 364/770 X |
| 4,054,788 | 10/1977 | Maitland et al. ................ | 364/770 X |
| 4,153,939 | 5/1979 | Kudov ................................ | 364/770 |
| 4,218,750 | 8/1980 | Carter et al. ......................... | 364/770 |
| 4,280,190 | 7/1981 | Smith .................................... | 364/770 |

OTHER PUBLICATIONS

Elliott, "Increment–Decrement Logic", *IBM Tech. Disclosure Bulletin,* vol. 11, No. 3, Aug. 1968, pp. 297-298.

*Primary Examiner*—David H. Malzahn
*Attorney, Agent, or Firm*—Bruce C. Lutz; Howard R. Greenberg; H. Frederick Hamann

[57] ABSTRACT

A circuit is illustrated for performing an increment function wherein a savings of parts is obtained by using an inverter for two different functions thereby decreasing land area required for implementing the integrated circuit on a chip.

3 Claims, 1 Drawing Figure

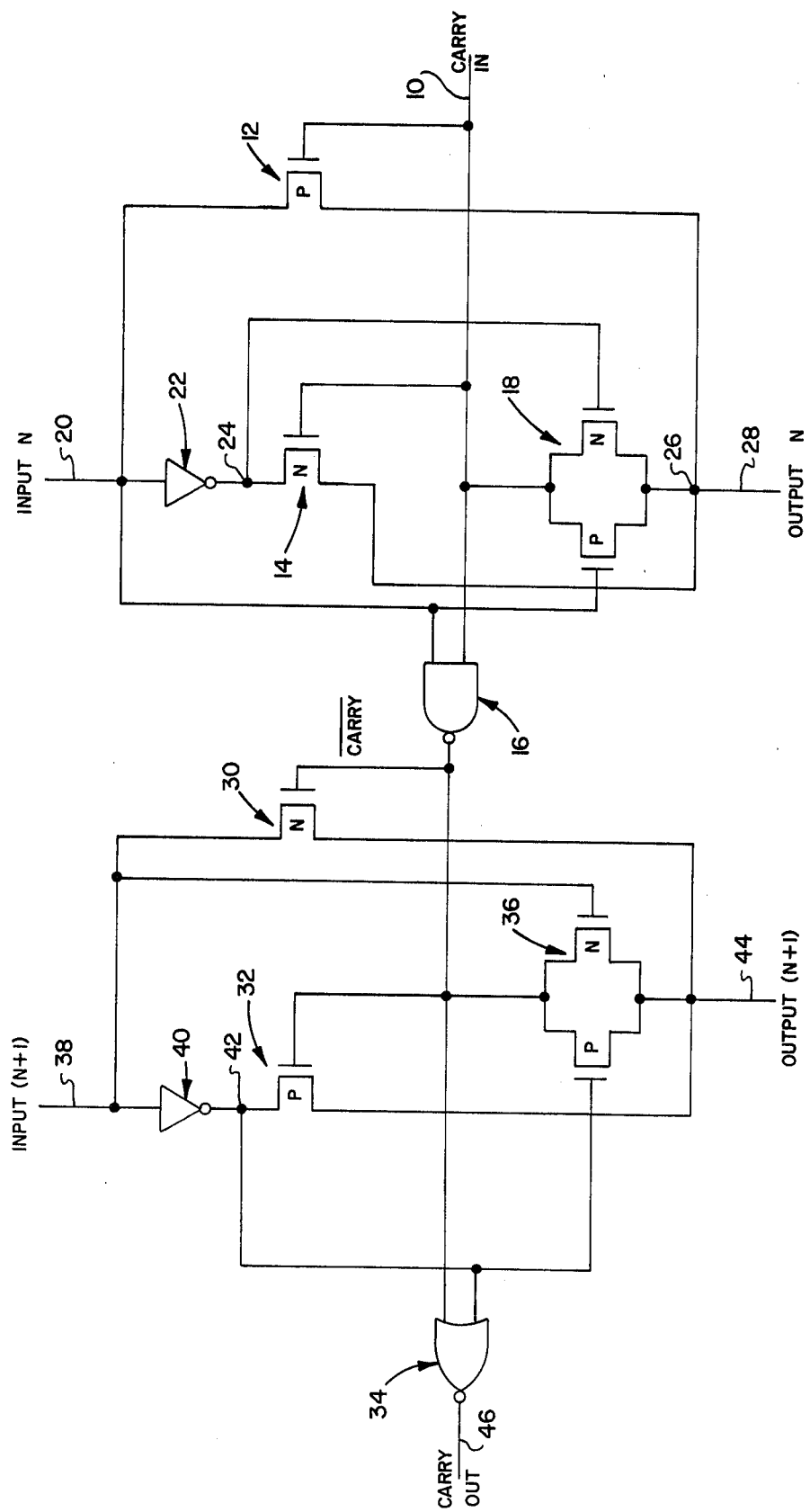

DIGITAL BINARY INCREMENT CIRCUIT APPARATUS

The present invention is generally concerned with electronics and more specifically concerned with digital state machines. Even more specifically, the present invention is concerned with a specific implementation of an increment word function in a digital computer.

As is well known to those skilled in the art, there are many types of increment circuits for incrementing a digital word. The closest prior art known is illustrated in an application Ser. No. 283,305, filed in the name of Jeffrey D. Russell on July 14, 1981, as the present invention and assigned to the same assignee as the present invention.

This co-pending application discloses a general concept for saving components in an integrated circuit design. However, the circuit as presented in the Russell application required the use of three inverters. One inverter is incorporated in each of the exlusive OR circuits and a further inverter is utilized in inverting alternate incoming data bits from the word to be incremented.

By appropriate circuit design, the present invention reduces the required number of inverters to two inverters by utilizing one of the inverters internal to an exclusive OR circuit for providing the bit inversion function to be supplied to one of the components in the series ripple carry circuit.

It is therefore an object of the present invention to provide more economical use of an integrated circuit chip by minimizing components and thereby reducing circuit complexity and increasing reliability.

Other objects and advantages of the present invention may be ascertained from a reading of the specification and appended claims in conjunction with a single drawing which illustrates a specific circuit implementation of the present inventive concept.

DETAILED DESCRIPTION

In the drawing a carry in lead 10 provides signals to the gate of a P channel FET or gating means 12, an N channel FET or gating means 14, an input of a NAND gate 16 and the input of a transmission gate or gating means 18. An N bit position lead 20 provides signals from the Nth bit position in a digital word to be incremented to an input of P channel transistor 12 (the source), to an input of an inverter generally designated as 22 and to a second input of NAND gate 16 as well as to a control lead of transmission gate 18. An output of inverter 22 is connected to a junction point 24 which is further connected to a source lead of N channel FET 14 and to a second control lead of transmission gate 18. Gate 18 is connected between input 10 and a junction point 26. Junction point 26 is also connected to the drain of N channel FET 14 and the drain of P channel FET 12 as well as being connected to a lead 28 which comprises the output of the presently described stage and is labeled output N. Output N represents the N bit position of the incremented word. An output of NAND gate 16 is connected to supply control signals to each of N channel FET transistor or gating means 30, a P channel FET transistor or gating means 32, an input of a NOR gate 34 and an input of a transmission gate or gating means 36. Interior to transmission gate 36 are a P and N channel FET with their source leads connected to the input and their drain leads connected to the output in a manner identical with that of transmission gate 18. An input (N+1) lead 38 supplies signals to an inverter 40 as well as to a source lead of FET 30 and a gate of the N channel FET within transmission gate 36. An output of inverter 40 is connected to a junction point 42 which is further connected to a second input of NOR gate 34, a gate of the P channel transistor within transmission gate 36, and to a source lead of P channel transistor 32. An output (N+1) lead 44 is connected to the drains of all the FET's within transmission gates 30, 32 and 36. Lead 44 supplies the signal representative of the bit position (N+1) in the incremented word. Finally, a carry output lead 46 from NOR gate 34 supplies signals in a ripple carry fashion to any further stages of circuitry. If this is the final bit position, this output provides an overflow indication of the incremented word.

OPERATION

In a co-pending application Ser. No. 283,268 assigned to the same assignee as the present invention and filed on July 14, 1981, I have illustrated an exclusive OR circuit and an exclusive NOR circuit. Although a brief description of these circuits is presented herein, a more complete description and better understanding of the circuit involved may be ascertained from reading the referenced disclosure.

Further, for a better understanding of increment circuits in general, reference may be made to the Russell application previously discussed at the beginning of this material.

Generally, the present invention operates by exclusive ORing the signals supplied on leads 10 and 20 through the combination of the circuit shown on the right hand portion of the FIGURE. Since the leads 10 and 20 are also supplied to the NAND gate 16, the signals supplied by these leads are unaffected by the exclusive OR action. It will be noted however, that the output of NAND gate 16 is not a carry signal but rather is a $\overline{\text{carry}}$ signal or inverted logic carry signal. It may be further noted that the signal passed to the output 44 from input 38 is also inverted for the (N+1) bit position as compared to the N bit position. If the left hand portion of the FIGURE were by itself and had normal logic input signals, it could be called an exclusive NOR circuit. However, since the inverted logic input signals were available, advantage is taken of this fact to reduce components by using an exclusive NOR circuit to function as an exclusive OR circuit since it already has inverted logic inputs. Therefore, the inverter 40 can serve a double function of inverting alternate bit position input signal logic values as well as performing the exclusive OR inversion function for signal passage and signal control.

Referring again to stage N, it will be noted that as long as the signal on lead 20 is a logic zero, the transmission gate 18 is in an ON condition and therefore the carry input signal on lead 10 is passed directly on output 28. In other words, if the signal on lead 10 is a logic zero, a logic zero is supplied to lead 28 and if it is a logic one, this logic one signal is supplied to lead 28. The logic table for an exclusive OR circuit indicates that an output should appear at lead 28 only when one or the other of the inputs 10 and 20 is a logic one and should remain a logic zero at all other times. In other words, lead 28 should be a logic zero when inputs 10 and 20 are both a logic zero or both a logic one. If lead 10 is a logic zero, PFET 12 is turned ON and if input lead 20 is a logic one, this logic one is passed to output 28. If, however, input 20 is a logic zero, transmission gate 18 is turned ON as well as PFET 12 and due to the lower impedance of transmission gate 18, the logic zero from lead 10 is passed to output 28. Finally, the condition of leads 10 and 20, both being a logic one, will turn OFF transmission gate 18 and PFET 12 but turn ON NFET 14 which passes the inverted logic from 20 (a logic zero at junction 24) to the output through NFET 14 since NFET 14 is turned to an ON condition by the logic one on lead 10.

The same reasoning can be used for stage (N+1) wherein a logic one on lead 38 will turn transmission gate 36 to an ON condition so that any signals from the output NAND gate 16 are passed to output 44. If the input on lead 38 is a logic zero, this will be passed to output 44 when the output of NAND gate 16 is a logic one (actually an inverted logic zero) and when the output of NAND gate 16 is a logic zero, the logic one output from inverter 40 is passed through transmission gate 32 to output 44. Since the input to NOR gate 34 from NAND gate 16 is already inverted logic, the correct output will be obtained by providing further inverted logic from junction point 42 to obtain the correct output.

From the above, it may be ascertained that the N stage uses a logic true carry input and generates a logical false carry output. The (N+1) stage uses a logical false carry input and generates a logical true carry output.

As indicated in the first referenced application in the name of Russell, a digital word may be incremented, as input on a concatenation of stages, by supplying a carry input of logic one on lead 10. If a no operation (NOP) or no incrementation is desired, the input may be passed unaltered to the output by supplying a logic zero as a carry input to lead 10 which may be assumed to be the first stage of the concatenation of stages.

The present invention thus recognizes, that a circuit may be simplified for performing an increment function by using inverse logic for a second stage exclusive OR circuit in such a manner that two inverters can provide the desired circuit function rather than the three inverters required in the prior art as disclosed in the referenced Russell application by using the teachings of my co-pending application also previously referenced.

As will be apparent to those skilled in the art, other modifications may be made to the circuit and still stay within the confines of my inventive concept, thus, I wish to be limited not by the specific circuit illustrated but only by the scope of the appended claims, wherein:

I claim:

1. A ripple carry incrementer circuit comprising, in combination:
   first means for providing a carry input signal to said increment circuit;
   second means for inputting N bit position data bit signals;
   NAND gate means including first and second input means and output means;
   first inverter means including input and output means;
   first, second and third gating means each including control means, input means and output means;
   third means for providing N bit position data bit output signals;
   fourth means for connecting said signal supplied by said first means to said control means of each of said first and second gating means and to said first input means of said NAND gate means as well as to said input means of said third gating means;
   fifth means for connecting said second means to said input means of said first inverter means, to said second input means of said NAND gate means, said control means of said third gating means and to said input means of said first gating means for application of signals therethrough;
   sixth means for connecting said output means of said inverter means to said control means of said third gating means and to said input means of said second gating means;
   seventh means connecting said output means of each of said first, second and third gating means to said third means for supplying signals thereto as passed by said gating means;
   fourth, fifth and sixth gating means each including input means, and output means and control means;
   eighth means for inputting (N+1) bit position data bit signals;
   ninth means for outputting (N+1) bit position data bit signals;
   NOR gate means including first and second input means and carry output means;
   second inverter means including input and output means;
   tenth means connecting said output of said NAND gate means to said control means of each of said fourth and fifth gating means as well as to said first input means of said NOR gate means and to said input means of said sixth gating means for supplying signals thereto;
   eleventh means connecting said eighth means to said input means of said second inverter means, said control means of said sixth gating means and said input means of said fourth gating means for supplying signals thereto;
   twelfth means connecting said output means of said second inverter means to said second input means of said NOR gate means, said control means of said sixth gating means and to said input means of said fifth gating means; and
   thirteenth means connecting said output means of each of said fourth, fifth and sixth gating means to said ninth means for outputting (N+1) bit position signals.

2. The method of incrementing a digital word comprising the steps of:
   exclusive ORing serial path input signals with parallel path data bits representing given bit positions in the word to be incremented for alternate data bit positions in the word wherein switches are operated as part of the exclusive ORing operation comprising the substeps of,
   passing a logic value of the parallel path data bit in accordance with the logic value of the serial path input signal, and
   passing the serial input signal to a parallel output port for that bit position in accordance with the logic value of the parallel path data bit input signal;
   NANDing the serial input and data bit position signal for said alternate bit positions to provide an inverted logic carry signal as an output serial path signal;
   exclusively NORing the signals received in the serial data path with the signals received from the remaining bit positions in the parallel path from the word wherein the data bit signal is inverted only a single time and is used to operate a switch as part of the exclusive NORing operation comprising the substeps of, inverting the parallel path data bit signal, passing the serial input signal as a function of the logic value of the inverted parallel path data bit signal, and outputting signals representative of the incremented version of the word for the remaining bit positions; and NORing the exclusively NORed serial path signals with said remaining data bit position data bits after processing by the inverting portion of said exclusive NOR circuitry.

3. Apparatus for incrementing a digital word comprising, in combination:

means for supplying first and second parallel path data bits;

means for supplying first serial path data bits;

means for exclusive ORing said first serial path data bits with said first parallel path data bits including first parallel data bit output port means, switching means for passing the logic value of the first parallel path data bits in accordance with the logic value of said first serial path data bits and further switching means for passing said first serial path data bits in accordance with the logic value of first parallel path data bits and means connecting the outputs of said switches to said first parallel path output port means;

means for NANDing said first serial data bit signal with said first parallel path data bits to provide a second serial path data bit signal representing an inverted logic carry signal for a digital word to be incremented;

means for exclusively NORing the signal received from said means for NANDing with the second parallel path data bit including a single inverting means, switching means for passing the second serial path data bit signal in accordance with the logic value of said second parallel path data bit, further switching means for passing second parallel path data bits in either the inverted or non-inverted form in accordance with the logic value of said second serial path data bit signal and means for supplying said switched signals to a parallel output port for that bit position in the digital word to be incremented; and means for NORing the second serial path signal with said second parallel path signal as received from said single inverting means of said means for exclusively NORing signals to provide third serial path data bit signals.

* * * * *